Dec. 5, 1961 J. B. CATALDO 3,012,218
BUS DUCT HAVING STACKED BUS BARS
Filed Feb. 10, 1960 4 Sheets-Sheet 1
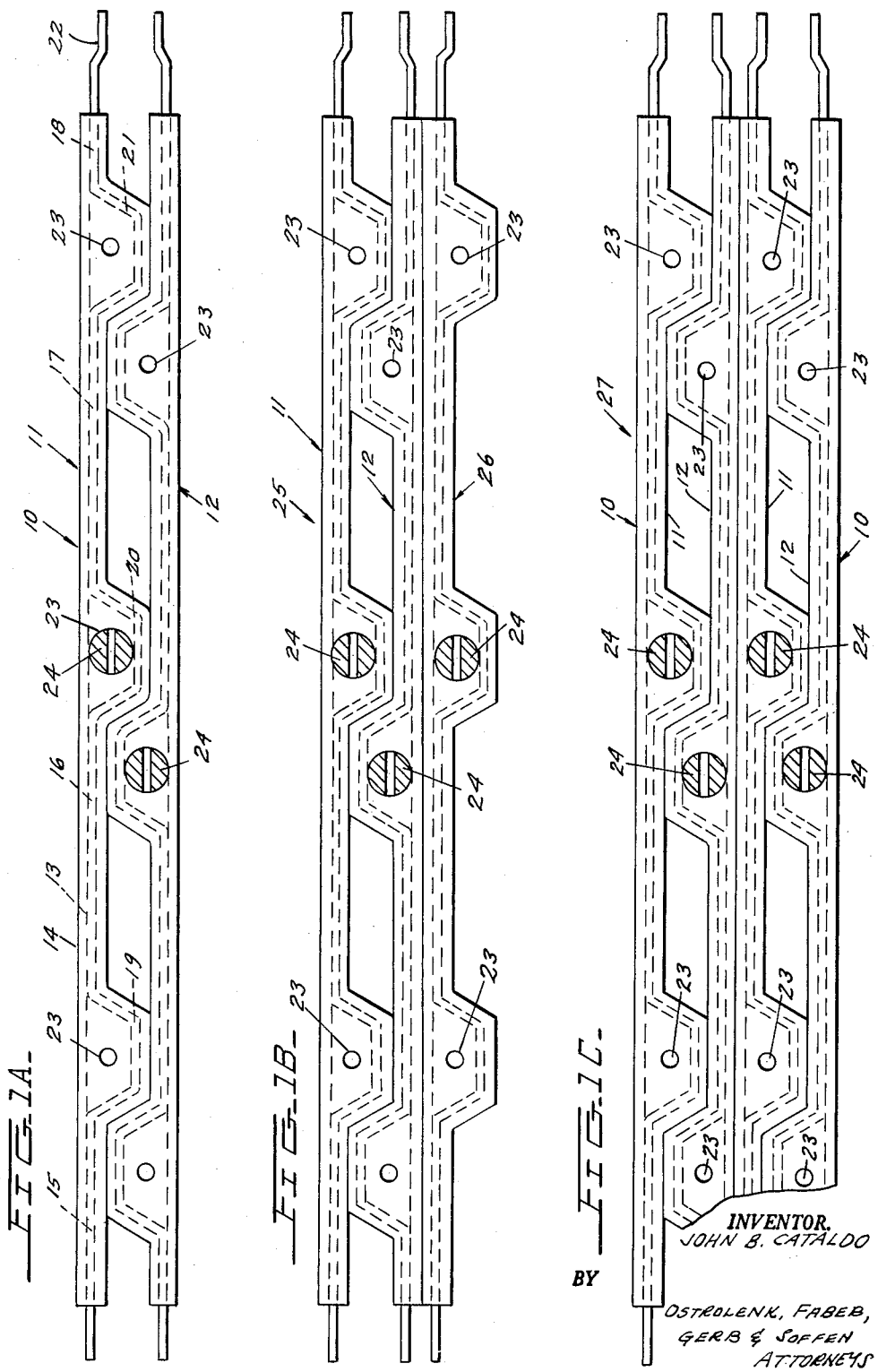
INVENTOR.
JOHN B. CATALDO
BY
OSTROLENK, FABER,
GERB & SOFFEN
ATTORNEYS

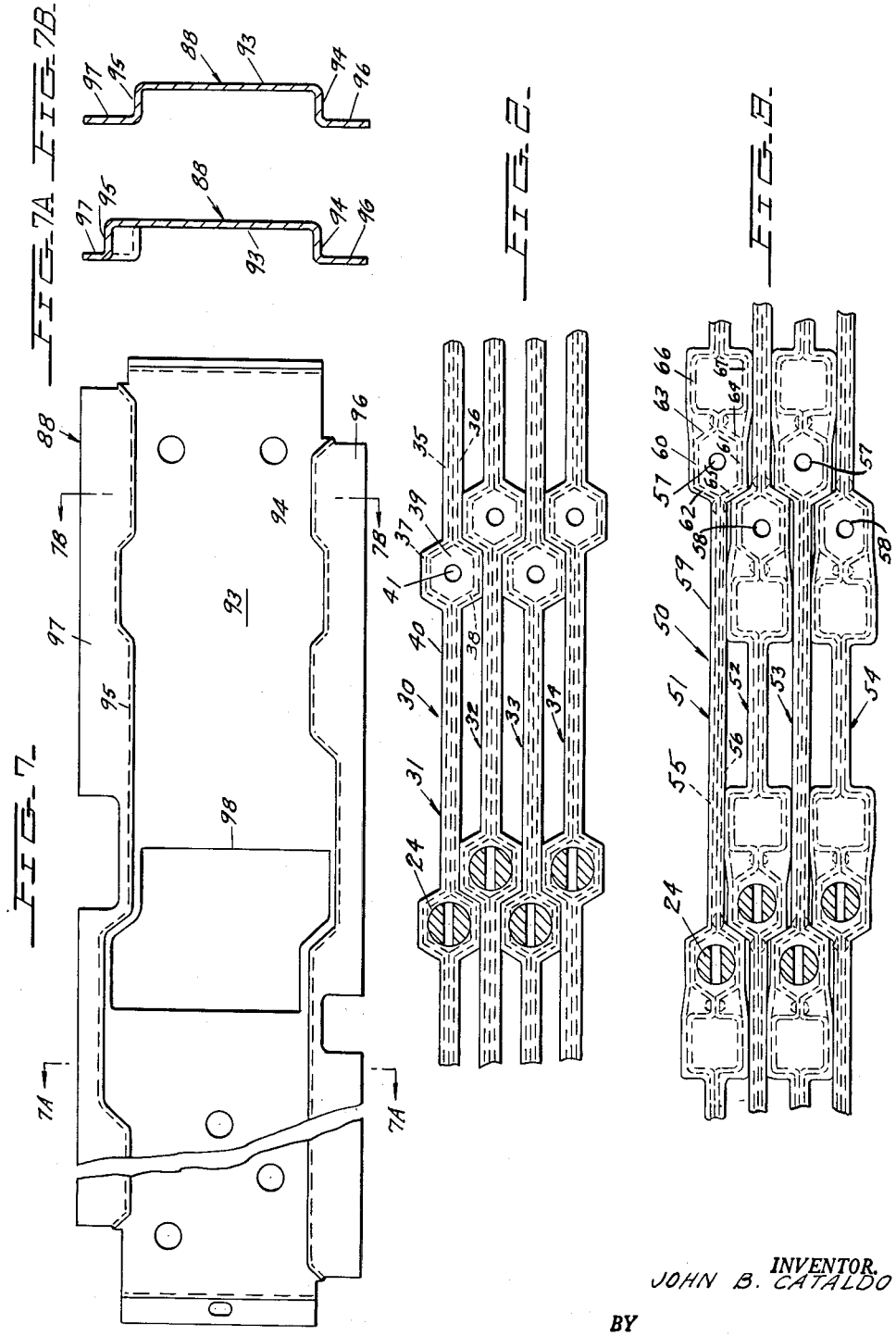

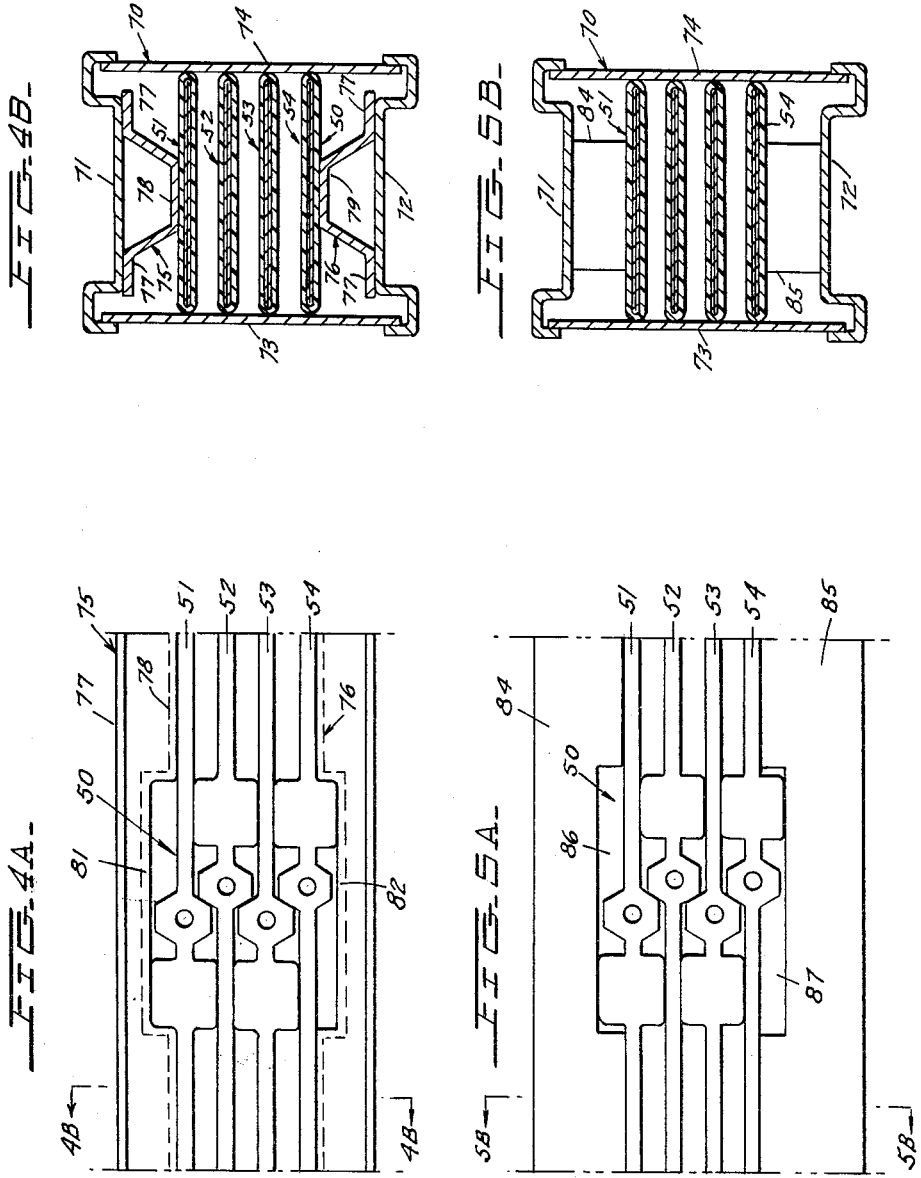

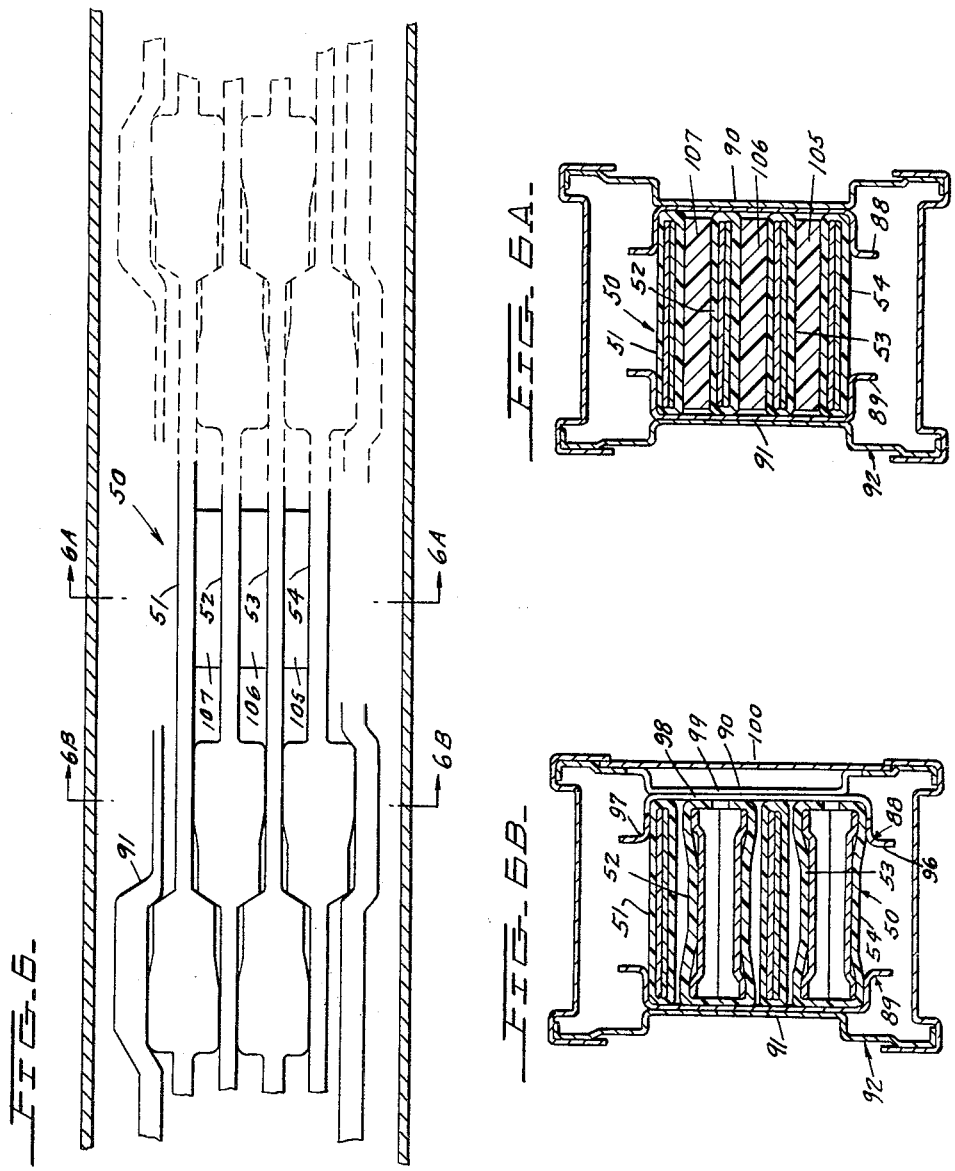

United States Patent Office 3,012,218
Patented Dec. 5, 1961

3,012,218
BUS DUCT HAVING STACKED BUS BARS
John B. Cataldo, Birmingham, Mich., assignor to I-T-E Circuit Breaker Company, Philadelphia, Pa., a corporation of Pennsylvania
Filed Feb. 10, 1960, Ser. No. 7,810
21 Claims. (Cl. 339—22)

The instant invention relates to bus duct in general and more particularly to a novel arrangement for maintaining the bus bars in operative position with respect to each other as well as with respect to the duct housing.

The construction of electrical distribution bus duct involves the economical combination, consistent with sound engineering principles, of conducting material, insulation, and supporting structure to maintain the conductors operatively positioned.

In the usual bus duct construction, insulated or uninsulated bus bars are maintained in position by support members which are separate from the housing. The support members comprise porcelain or cold molded blocks having slots to accommodate the bus bars which are clamped on either side of the bus bars.

As bus ducts have become more refined and attempts made to provide more compact structures in which there is a more economical utilization of supporting members, it has become increasingly difficult to find satisfactory materials for the supporting members since the porcelain type and cold molded materials do not lend themselves to narrow widths. In addition, most of the thermosetting materials do not have sufficient strength to withstand the high impact forces encountered during short circuit conditions.

The device of the instant invention provides a compact bus duct structure which is made economical to manufacture by utilizing insulation covered bus bar means having offset portions. The offset portions abut adjacent insulation covered bus bars and in this way provide the necessary spacing between bus bars required for circulation of air for cooling purposes. The bus bar offsets also abut the offsets of adjacent bus bars for axial positioning of the bus bars with respect to one another.

The offsets are also engaged by suitable means carried by the duct housing whereby the bus bars are properly positioned so that predetermined portions thereof are in alignment with plug-in openings for attachment devices and the ends of the bus bars are properly positioned for coupling to other duct sections. In addition to aligning the bus bars the offsets define plug-in openings to receive duct fingers of devices mounted to the duct housing and are electrically energized through contact with the bus bars.

Since a bus duct consists of metal parts having different linear coefficients of expansion, changes in temperature cause differential expansion between the parts. That is, the housing is usually constructed entirely of steel while the bus bars are constructed of copper or aluminum. In order to compensate for the differential expansion, prior art duct constructions usually employ flexible braiding or sliding members in some portion of the duct run. In the device of the instant invention the spacing offsets of the bus bars provide the necessary flexibility to compensate for differential expansion within each duct section.

By utilizing insulation covered bus bars, the bus bars are clamped either directly by the housing or by metal clamping members in intimate contact with the housing. Thus, a good heat conducting path is provided between the bus bars and the housing through the insulation covering of the bus bars and in this manner the bus temperature can readily be maintained at a reasonably low level.

Accordingly, a primary object of the instant invention is to provide a novel bus duct construction wherein the bus bars are spaced without the utilization of special supporting members.

Another object is to provide a bus duct construction having novel means for positioning the bus bars relative to each other as well as relative to the housing whereby predetermined portions of the bus bars are in alignment with the housing plug-in openings and the ends of the bus bars are accurately positioned for connection to the bus bar of adjacent duct sections.

Still another object is to provide a novel bus duct construction which is inherently strong by virtue of its compactness and which is, nevertheless, simple to assemble.

A further object is to provide a bus duct construction having novel means within each duct section to compensate for differential expansion between the parts of the duct.

A still further object is to provide a novel bus duct construction utilizing a stacked bus bar configuration clamped by the housing so that excellent heat transfer characteristics are obtained.

These as well as other objects of the instant invention shall become readily apparent after studying the following description of the accompanying drawings in which:

FIGURES 1A–1C are side elevations of bus bar stacks constructed in accordance with the teachings of the instant invention. In FIGURE 1A the stack consists of two assemblies each comprising a bus bar with an insulation covering thereon. The embodiment of FIGURE 1B consists of three such assemblies while the embodiment of FIGURE 1C consists of four such assemblies.

FIGURE 2 is a fragmentary side elevation illustrating an embodiment of the instant invention utilizing laminated bus bars.

FIGURE 3 is a fragmentary side elevation of an embodiment of the instant invention wherein laminated bus bars are formed to provide two offset pockets, one to receive the contact fingers of a plug-in device, and the other to allow for differential expansion within the duct section.

FIGURE 4A is a fragmentary side elevation of a duct with the housing removed illustrating a channel clamping means for maintaining bus bars in position.

FIGURE 4B is a cross-section taken through line 4B—4B of FIGURE 4A looking in the direction of arrows 4B—4B, with the duct housing included.

FIGURE 5A is a fragmentary side elevation of a duct with the housing removed illustrating a solid member clamping means for maintaining the bus bars in position.

FIGURE 5B is a cross-section of FIGURE 5A with the duct housing included, taken through line 5B—5B looking in the direction of the arrows.

FIGURE 6 is a fragmentary side elevation of a bus duct with the near wall of the housing and the clamping members secured thereto removed so as to make the interior members visible.

FIGURES 6A and 6B are cross-sections taken through line 6A—6A and 6B—6B, respectively, of FIGURE 6 looking in the direction of the respective arrows.

FIGURE 7 is a plan view of one of the clamping members utilized in the embodiment of FIGURES 6–6B.

FIGURES 7A and 7B are cross-sections of the clamping member of FIGURE 7 taken through lines 7A—7A and 7B—7B, respectively, looking in the direction of the respective arrows.

Now referring to the figures, FIGURE 1A illustrates an elongated stack 10 comprising a first assembly 11 and a second assembly 12. Assembly 11 comprises bus bar 13 covered by sleeve 14 constructed of flexible insulating material such as butyl rubber.

Bus bar 13 comprises portions 15, 16, 17 and 18 extending generally parallel to the longitudinal axis of stack 12. The bus bar portions 15—18 are interconnected by longitudinally spaced offset portions 19—21 of bus bar 13 while end 22 of bus bar 13 is offset to facilitate a connection to an axially aligned bus bar (not shown). Insulation 14 is provided with expandable openings 23 in alignment with offsets 19—21 and are adapted to receive contact fingers 24 of a plug-in device (not shown) as described in detail in copending application Serial No. 815,562, filed May 25, 1959, in the name of Cataldo et al., entitled "Plug-In Section for Bus Duct," and assigned to the assignee of the instant invention.

Assembly 12 is of substantially the same construction as assembly 11, the only difference being that the offsets of assembly 12 are positioned to the left of the offsets in assembly 11. The bus bar offsets of both assemblies 11 and 12 are constructed and positioned so that spacing is provided for plug-in type contact fingers 24 to encounter exposed portions of the bus bars.

The offsets of assemblies 11 and 12 abut portions of the assemblies 12, 11, respectively, which extend substantially parallel to the longitudinal axis of stack 11. This establishes the operative spacing between 11, 12 and permits the circulation of air therebetween. The offsets of assembly 11 abut the offsets of assembly 12 thereby positioning the ends of bus bars 13 so that they are in position to be joined with bus bars of an adjacent stack (not shown).

In addition to the spacing function and the defining of plug-in locations the offsets 19—21 serve to permit differential expansions to take place within an individual duct section without undue mechanical stresses being set up when the ends of the bus bars are restrained as by joint connections. That is, although bus bars 13 are extremely strong in one plane they are extremely flexible in another plane so that deflection at offsets 19—21 takes place when forces due to thermal expansion are applied. Thus, all of the movement of a bus bar due to thermal expansion will take place within a single length of the stack and the bus bars will not move axially relative to other members.

In FIGURE 1B the stack 25 comprises assemblies 11 and 12 positioned as in FIGURE 1A and an additional assembly 26 identical in construction to assembly 11. The portions of assembly 26 extending parallel to the longitudinal axis of stack 25 about the portions of assembly 12 extending parallel to the longitudinal axis of stack 25.

In the embodiment of FIGURE 1C the stack 27 comprises two stacks 10 positioned side by side in abutting relationship with the parallel portions of assembly 12 of one stack 10 between the offsets abutting the parallel portions of assembly 11 of the other stack 10.

Thus, it is seen that any of the arrangements illustrated in FIGURES 1A–1C lend themselves to simple assembly by merely stacking the assemblies directly against one another. The entire assembly may be taped, encapsulated or held in a suitable manner as will be hereinafter explained so as to be capable of being picked-up and being handled as a single mass. The stacked arrangement is an inherently strong structure both from the mechanical and the electro-magnetic viewpoint. If the stack is held by engaging the faces of the outside assemblies the arrangement is capable of withstanding high impact forces encountered during short circuits.

In FIGURE 2 there is illustrated a stack 30 comprising a plurality of assemblies 31—34. Each of the assemblies 31—34 is comprised of a bus bar means constructed of two laminates 35, 36 having offsets 37, 38, respectively, positioned on opposite sides of the longitudinal axis of the respective assemblies 31—34 and cooperating to define a pocket 39 adapted to receive a plug-in finger 24. Laminates 35, 36 abut one another and are welded, riveted or otherwise mechanically secured to each other. The bus bar means 35, 36 of each assembly is covered by a flexible insulating sleeving 40 which is provided with expandable openings 41 in alignment with pockets 39.

The embodiment of FIGURE 3 comprises a stack 50 consisting of four assemblies 51—54 of substantially the same, though not identical, constructions. Assemblies 51—54 include a bus bar means constructed of two laminates 55, 56 secured to each other with the combination covered by insulating sleeving 59. The bus bar means 55, 56 includes a plurality of longitudinally spaced offset means each defining a first 57 and a second 58 pocket.

The smaller pocket 57 is adapted to receive a plug-in contact finger 24 and is constructed of portions 60, 61 extending parallel to the longitudinal axis of stack 50. These offset portions connected to the straight portions of bus bar means 55, 56 by portions 62—65 which intersect the longitudinal axis of the respective assemblies 51—54 at obtuse angles. Each of the larger pockets 58 are constructed of parallel offset portions 66, 67 connected to the straight portions of the assembly bus bar means by portions extending substantially at right angles to the longitudinal axis of stack 50. Straight portions 66, 67 are displaced a greater distance from the longitudinal axis of their respective assemblies 51—54 than are the parallel offsets 60, 61.

The portions of the offsets defining pocket 58 provide the spacing between assemblies 51—54 while the abutment between the inclined portions 62—65, with insulation interposed therebetween, serving to establish the relative longitudinal position of assemblies 51—54. The portions of the offsets defining pocket 58 provide flexibility to compensate for differential expansions of the members of the stack 50 as well as the other members (not shown) comprising a bus duct. Thus, all of the movement of a bus bar due to thermal expansion takes place within a single duct length and the bus bars do not move relative to other bus bars or other members of the duct.

In FIGURES 4A and 4B there is illustrated a means for clamping the stack 50 of FIGURE 3 within duct housing 70. Housing 70 comprises top and bottom members 71, 72 joined by side walls 73, 74 to define an elongated enclosure of generally rectangular cross-section. U-shaped channel members 75, 76 are welded or otherwise secured to the inside surface of top and bottom members 71, 72, respectively, at extensions 77 which extend downwardly from the free ends of channel members 75, 76.

The web 78 of members 75 engage the outside surface of assembly 51 while the web 79 of member 76 engages the outside surface of assembly 54. The channel clamping members 75, 76 are provided with offsets 81, 82, respectively, which define recesses to receive the offsets of the outside assemblies 51, 54, respectively. The intimate contact between clamping members 75, 76 and stack 50 provides a good heat conducting path direction to housing 70. The conduction of heat from bus bars 55, 56 to housing 70 is further facilitated by the engagement of the housing side walls 73, 74 with the edges of assemblies 51—54.

In the embodiment of FIGURES 5A and 5B the clamping channels (FIGURE 4B) are replaced by solid members 84, 85. Member 84 is interposed between the top 71 of housing 70 and the side assembly 51 while member 85 is interposed between the bottom of housing 70 and the side assembly 54. Suitable depressions 86, 87 are provided in members 84, 85 to receive the offset portions of stack 50. In this embodiment the edges of assemblies 51—54 are also engaged by the sides 73, 74 of housing 70.

In the embodiment of the instant invention illustrated in FIGURES 6-6B, the positioning of stack 50 is accomplished by channel-like clamping members 88, 89 which are welded or otherwise secured to the side walls 90, 91, respectively, of duct housing 92. As illustrated in FIGURES 7-7B, clamping member 88 is an elongated element constructed of sheet material formed into a generally U-shaped cross-section whose web 93 is many times longer than its arms 94, 95.

The free ends of arms 94, 95 are provided with outwardly turned portions 96, 97, respectively. In the region of clamp 88 which engages the offset portions of stack 50, web 93 is widened out to accommodate these offsets.

In alternate ones of the regions where web 93 is widened out, an opening 98 is provided in clamp member 88. The openings 98 are in alignment with longitudinally spaced openings 99 in the side 90 of housing 92. Each of the aligned openings 98, 99 are provided with a suitable sliding cover 100 as is well known to the art. In the embodiment of FIGURES 6-6B the clamping members 88, 89 engage assemblies 51—54 along edges thereof while in the embodiment of FIGURES 4A-5B the clamping members engage assemblies 51 and 54 on the sides thereof.

Clamp 89 closely resembles clamp 88 in appearance although the openings 98 of clamp member 89 are staggered with respect to the openings 98 of clamping member 88 so that plug-in access is provided from alternate sides of the duct at alternately longitudinally spaced plug-in locations.

Spacing members 105—107 are provided between assemblies 51—54 in the spaces between the parallel portions of assemblies 51—54. Members 105—107 serve to prevent excessive bar motion which would otherwise be caused by high circuit currents. In a given installation, if the magnitude of available short circuit currents is in some manner limited, as by utilization of a so-called current limiting fuse, the members 105—107 are not necessary.

Thus, I have provided a novel stacked bus bar arrangement for a duct system. The stack comprises a plurality of assemblies each including a bus bar means having an insulation covering. The bus bar means includes offsets which establish offset portions for the assemblies whereby the assemblies are stacked in abutting relationship with the offsets establishing the spacing between the bus bars as well as establishing the proper longitudinal positions for the bus bars and compensating for differential expansion within each duct section.

Although I have here described preferred embodiment of my novel invention, many variations and modifications will now be apparent to those skilled in the art, and I therefore prefer to be limited, not by the specific disclosure herein, but only by the appending claims.

I claim:

1. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions.

2. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; said first assembly offset portions also abutting said second assembly offset portions.

3. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said offset means comprising a first offset, adapted to receive a plug-in unit contact finger, and a second offset to provide flexibility which compensates for thermal expansion of the elements comprising said stack.

4. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said offset means comprising a first offset, adapted to receive a plug-in unit contact finger, and a second offset to provide flexibility which compensates for thermal expansion of the elements comprising said stack; said first assembly offset portions also abutting said second assembly offset portions.

5. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said offset means comprising a portion parallel to said longitudinal axis and connected to one of said straight portions by an inclined portion also comprising said offset means.

6. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said offset means comprising a first offset, adapted to receive a plug-in unit contact finger, and a second offset to provide flexibility which compensates for thermal expansion of the elements comprising said stack; said first offset comprising a first portion parallel to said longitudinal axis and connected to said straight portions by second and third portions inclined at obtuse angles with respect to said first portion and extending from the ends thereof; said second offset comprising a portion parallel to said longitudinal axis and portions extending from the ends thereof substantially perpendicular thereto and joining said straight portions.

7. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; said first assembly offset portions also abutting said second assembly offset portions; said insulating means having apertures therein aligned with pockets formed by said offset means.

8. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said offset means comprising a first offset, adapted to receive a plug-in unit contact finger, and a second offset to provide flexibility which compensates for thermal expansion of the elements comprising said stack; said insulating means having apertures therein aligned with pockets formed by said first offsets.

9. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said bus bars being comprised of a first and a second laminate which abut each other along portions extending parallel to said longitudinal axis.

10. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said bus bars being comprised of a first and a second laminate which abut each other along portions extending parallel to said longitudinal axis; each of said bus bar offset means being comprised of cooperating formations of their associated first and second laminates arranged symmetrically with respect to the plane of abutment between their associated first and second laminates.

11. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; each of said offset means comprising a first offset, adapted to receive a plug-in unit contact finger, and a second offset to provide flexibility which compensates for thermal expansion of the elements comprising said stack; each of said bus bars being comprised of a first and a second laminate which abut each other along portions extending parallel to said longitudinal axis; each of said bus bar offset means being comprised of cooperating formations of their associated first and second laminates arranged symmetrically with respect to the plane of abutment between their associated first and second laminates.

12. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; a third assembly of substantially the same construction as said second assembly; said third assembly straight portions abutting said second assembly straight portions.

13. A first elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; a second stack comprising a third and a fourth assembly each substantially constructed and operatively positioned as said first and said second assemblies; said third assembly straight portions abutting said second assembly straight portions.

14. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; an elongated housing within which said stack is disposed; and clamping means abutting inner surfaces of said housing and engaging and maintaining said stack in operative position.

15. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; an elongated housing within which said stack is disposed; a clamping means abutting inner surfaces of said housing and engaging and maintaining said stack in operative position; said clamping means comprising a first and a second channel member, said first channel member engaging a face of said stack.

16. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; an elongated housing within which said stack is disposed; a clamping means abutting inner surfaces of said housing and engaging and maintaining said stack in operative position; said clamping means comprising a first and a second channel member; said first channel member engaging a face of said stack; said assemblies having narrow edges thereof abutting said housing at opposed interior surfaces thereof.

17. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; an elongated housing within which said stack is disposed; a clamping means abutting inner surfaces of said housing and engaging and maintaining said stack in operative position; said clamping means comprising a first and a second solid member; said first solid member engaging a face of said stack; said solid member having depressions wherein said offset portions are disposed.

18. An elongated stack comprising a first and a second assembly each including a bus bar and a thin insulating means covering for said bus bar; each of said bus bars having straight portions positioned parallel to the longitudinal axis of said stack; said first assembly including offset portions, each formed by an individual offset means of said first assembly bus bar, which extend toward said second assembly; said second assembly including offset portions, each formed by an individual offset means of said second assembly bus bar, which extend toward said first assembly; said first assembly offset portions abutting said second assembly at portions thereof extending parallel to said longitudinal axis and positioned between said second assembly offset portions; said second assembly offset portions abutting said first assembly at portions thereof extending parallel to said longitudinal axis and positioned between said first assembly offset portions; an elongated housing within which said stack is disposed; a clamping means abutting inner surfaces of said housing and engaging and maintaining said stack in operative position; said clamping means comprising a first and a second solid member; said first solid member engaging a face of said stack; said solid member having depressions wherein said offset portions are disposed; said assemblies having narrow edges thereof abutting said housing at opposed interior surfaces thereof.

19. An elongated stack comprising at least three elongated assemblies extending parallel to the longitudinal axis of said stack; each of said assemblies including bus bar means and a thin insulating covering for said bus bar means; each of said assemblies including offset portions formed by offsets of said bus bar means; each of said assemblies having the offset portions thereof abutting straight portions of adjacent assemblies as well as abutting offset portions of adjacent assemblies.

20. An elongated stack comprising at least three elongated assemblies extending parallel to the longitudinal axis of said stack; each of said assemblies including bus bar means and a thin insulating covering for said bus bar means; each of said assemblies including offset portions formed by offsets of said bus bar means; each of said assemblies having the offset portions thereof abutting straight portions of adjacent assemblies as well as abutting offset portions of adjacent assemblies; each of said bus bar means offsets comprising a pocket constructed and positioned to receive a plug-in contact finger, and a pocket constructed and positioned to provide flexibility which compensates for thermal expansion of the elements comprising said stack.

21. A bus bar comprising a first and a second laminate; each having a first plurality of longitudinally spaced offsets with the offsets of said first laminate extending in a direction opposite to the offsets of said second laminate; said first laminate offsets being aligned opposite said second laminate offsets to cooperate therewith in defining contact receiving locations; a yieldable insulating sleeve having said bus bar disposed therein; said sleeve having apertures positioned at said contact receiving locations; each of said laminates having additional offsets positioned in close proximity to each offset of said first plurality of offsets and extending in the same direction; said additional offsets adapted to yield and thereby compensate for longitudinal expansion within said bus bar.

References Cited in the file of this patent

UNITED STATES PATENTS

| | | |
|---|---|---|
| 1,966,379 | Dodge et al. | July 10, 1934 |
| 2,251,404 | Frank et al. | Aug. 5, 1941 |
| 2,284,097 | La Jone | May 26, 1942 |
| 2,361,721 | Van Deventer | Oct. 31, 1944 |
| 2,411,128 | Carlson | Nov. 12, 1946 |
| 2,441,461 | Wayne | May 11, 1948 |